Figure 1:
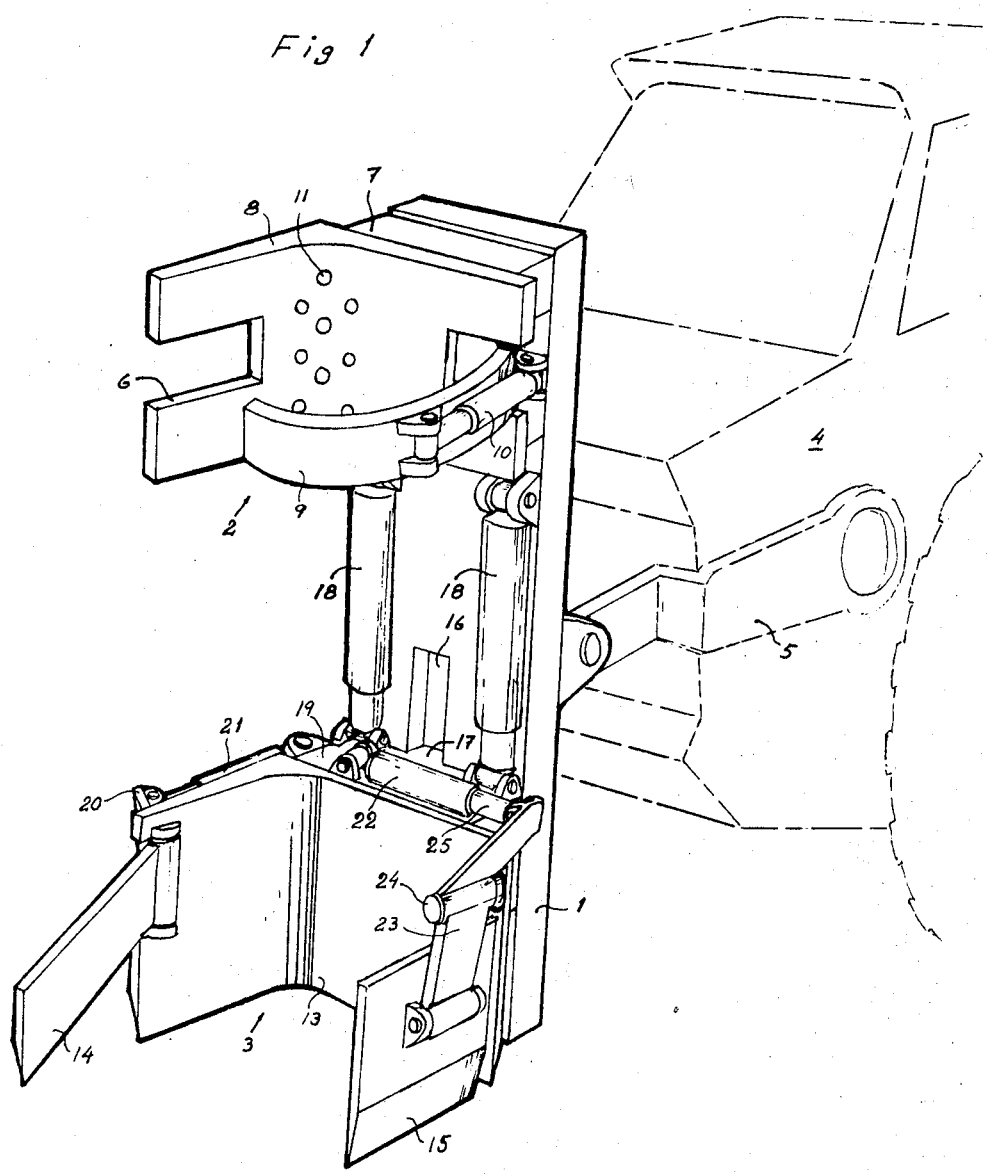

United States Patent [19]
Hultdin et al.

[11] 3,822,730

[45] July 9, 1974

[54] APPARATUS FOR FELLING TREES

[75] Inventors: Gustaf Matteus Hultdin; Ove Anders Hultdin, both of Mala, Sweden

[73] Assignee: Hultdins Verkstads AB, Mala, Sweden

[22] Filed: Dec. 3, 1971

[21] Appl. No.: 204,659

[30] Foreign Application Priority Data
Dec. 4, 1970 Sweden.............................. 16482/70

[52] U.S. Cl........................... 144/34 R, 144/309 AC
[51] Int. Cl............................................. A01g 23/08
[58] Field of Search .... 144/2 Z, 3 D, 34 R, 309 AC

[56] References Cited
UNITED STATES PATENTS

| | | | |
|---|---|---|---|
| 3,102,563 | 9/1963 | Horncastle.......................... | 144/3 D |
| 3,529,640 | 9/1970 | Kamner.............................. | 144/3 D |
| 3,531,235 | 9/1970 | Boyd et al........................... | 144/2 Z |
| 3,536,113 | 10/1970 | Sutherland.................... | 144/309 AC |
| 3,572,410 | 3/1971 | McElderry.......................... | 144/2 Z |
| 3,596,690 | 8/1971 | Hamilton............................. | 144/2 Z |
| 3,620,272 | 11/1971 | Eriksson............................. | 144/2 Z |
| 3,633,638 | 1/1972 | Groves............................... | 144/2 Z |
| 3,643,920 | 2/1972 | Widegren et al. ................ | 144/34 A |
| 3,688,821 | 9/1972 | McColl................................ | 144/3 D |
| 3,738,401 | 6/1972 | Wiklund et al............... | 144/309 AC |

FOREIGN PATENTS OR APPLICATIONS
231,260  3/1969  U.S.S.R............................. 144/2 Z

Primary Examiner—Gerald A. Dost
Attorney, Agent, or Firm—Robert C. Baker

[57]  ABSTRACT

The invention relates to an apparatus for machining trees, for example for pruning trees and/or felling trees. In particular, the invention refers to an apparatus for felling trees by separating from the trunk of a tree those roots and any root swelling extending peripherally outward from the trunk so that the same remain substantially in their original position under the ground. For this purpose the apparatus comprises a gripping member to hold the tree, a machining member provided with cutting means for machining the tree, one of said members being movably arranged on a frame through a longitudinal guide means immovably fixed to the frame, the other of said members being fixed to the frame which is in turn connected to a vehicle by means of crane or operating arms, and force transmitting means laterally spaced from the longitudinal guide means for moving said members away from each other along a line of movement guided by the longitudinal guide means.

18 Claims, 53 Drawing Figures

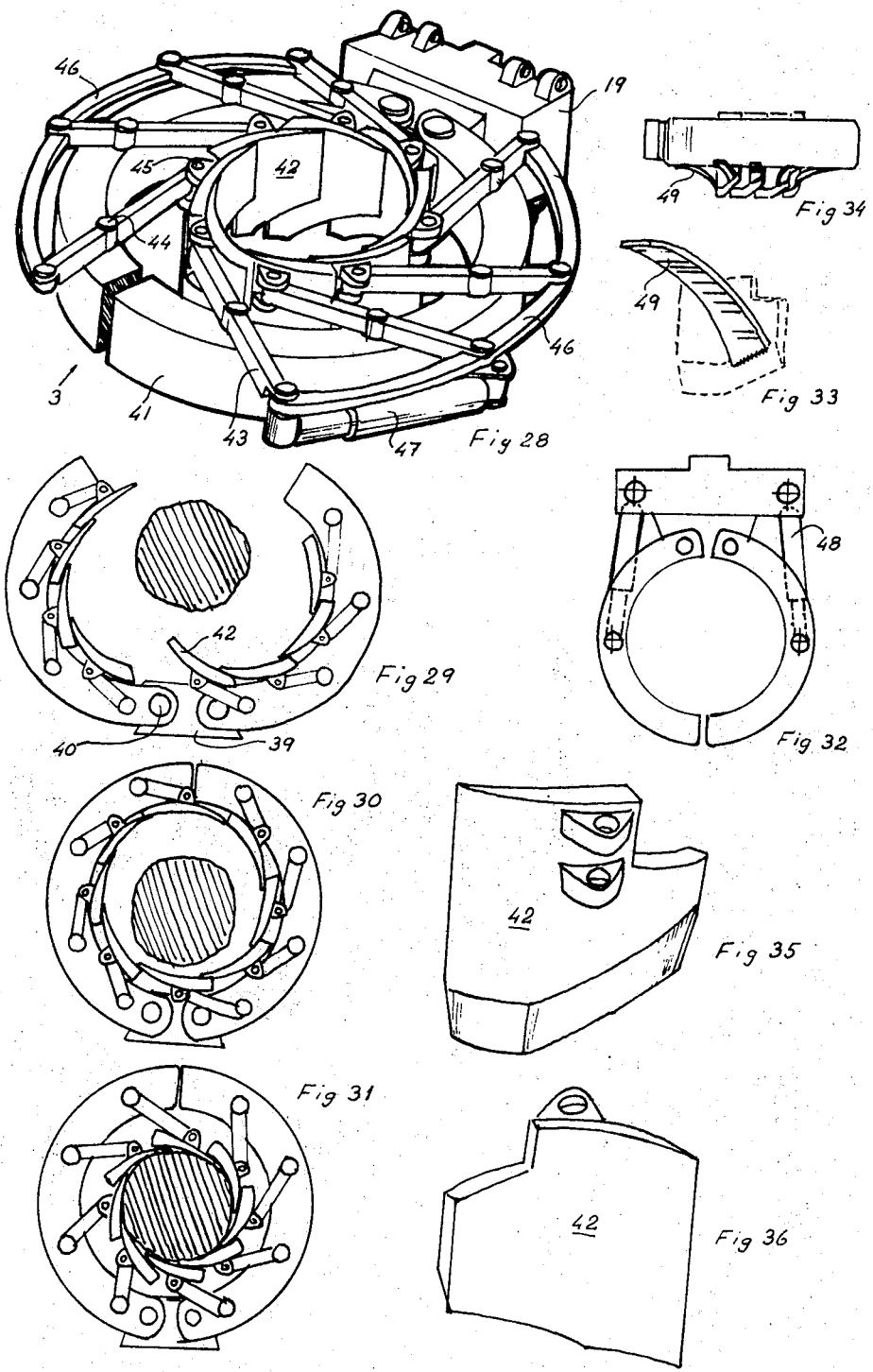

PATENTED JUL 9 1974
3,822,730
SHEET 12 OF 13

APPARATUS FOR FELLING TREES

The present invention relates to an apparatus for machining trees, for example for pruning trees and/or felling trees. In particular, the invention refers to an apparatus for felling trees by separating from the trunk of a tree those roots which extend peripherally outward therefrom so that those said roots remain substantially in their original position under the ground.

The apparatus comprises a frame, and means for flexibly mounting the frame to a vehicle for movement of the frame with respect to the vehicle. Further, it comprises a first member consisting essentially of a gripping member supported by the frame and arranged to grip and hold the trunk of a tree during application of an upward lifting force on the gripping member. A second member consists essentially of a machining member supported by the frame in spaced downward relationship from the gripping member. A longitudinal guide means is immovably fixed to the frame; through the longitudinal guide means at least one of the first and second members is movable with respect to the frame. A force transmitting means is laterally spaced from the longitudinal guide means and operates to effect relative movement of the gripping member and the machining member longitudinally away from each other along a line of movement guided by the longitudinal guide means. The machining member is characterized by having downwardly projecting exposed cutting edges as the lowermost structural part thereof; and these cutting edges are useful for machining the tree. The cutting edges are adapted to be positioned to substantially circumscribe the periphery of the trunk of the tree held by the gripping member and further are adapted to press into and sever those roots which extend peripherally outward from the trunk as the machining member is relatively moved longitudinally away from the gripping member.

The novelty of the apparatus according to the invention is that it comprises a frame or stand arranged to be operated by a vehicle by way of crane or operating arms in combination with the special arrangement for controlled movement of the gripping member or the machining member in relation to the frame or stand, with the other of these members being fixed to the frame or stand.

According to a suitable embodiment of the apparatus the gripping member is fixed to the stand and the machining member is movable in relation to the stand. Other embodiments of the apparatus are clear from the following disclosure and claims.

Figure 2:
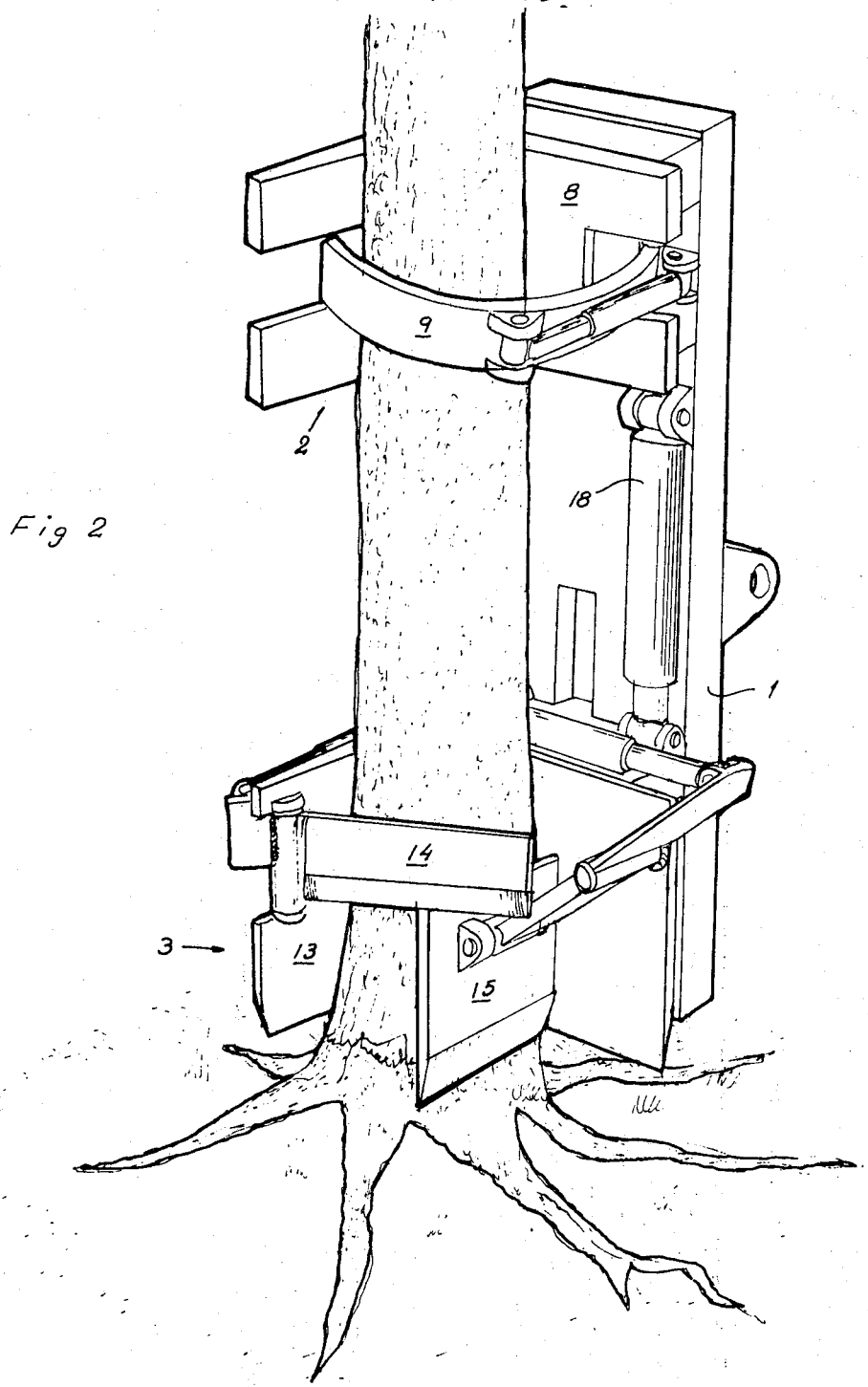
Figure 3:
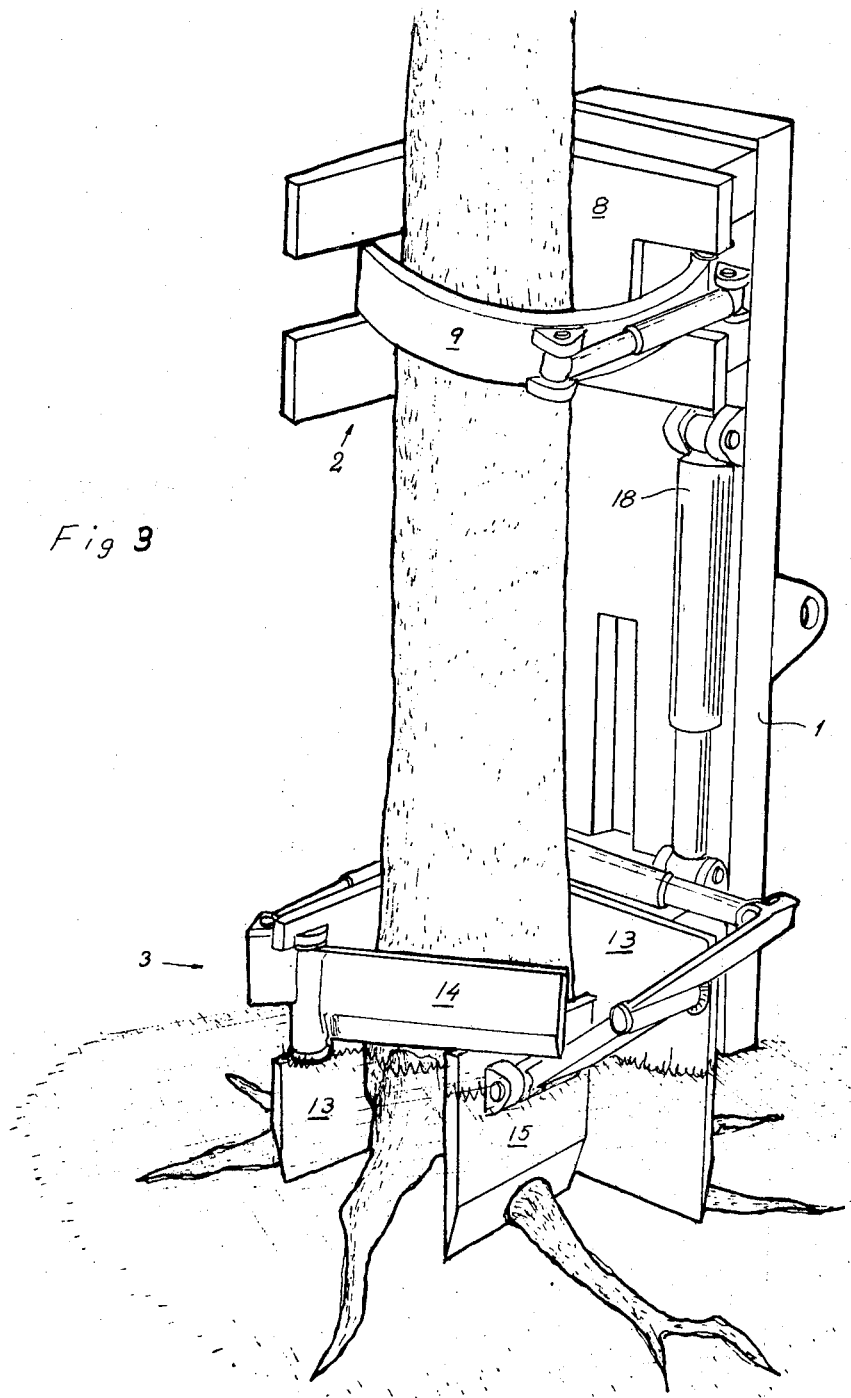
Figure 4:
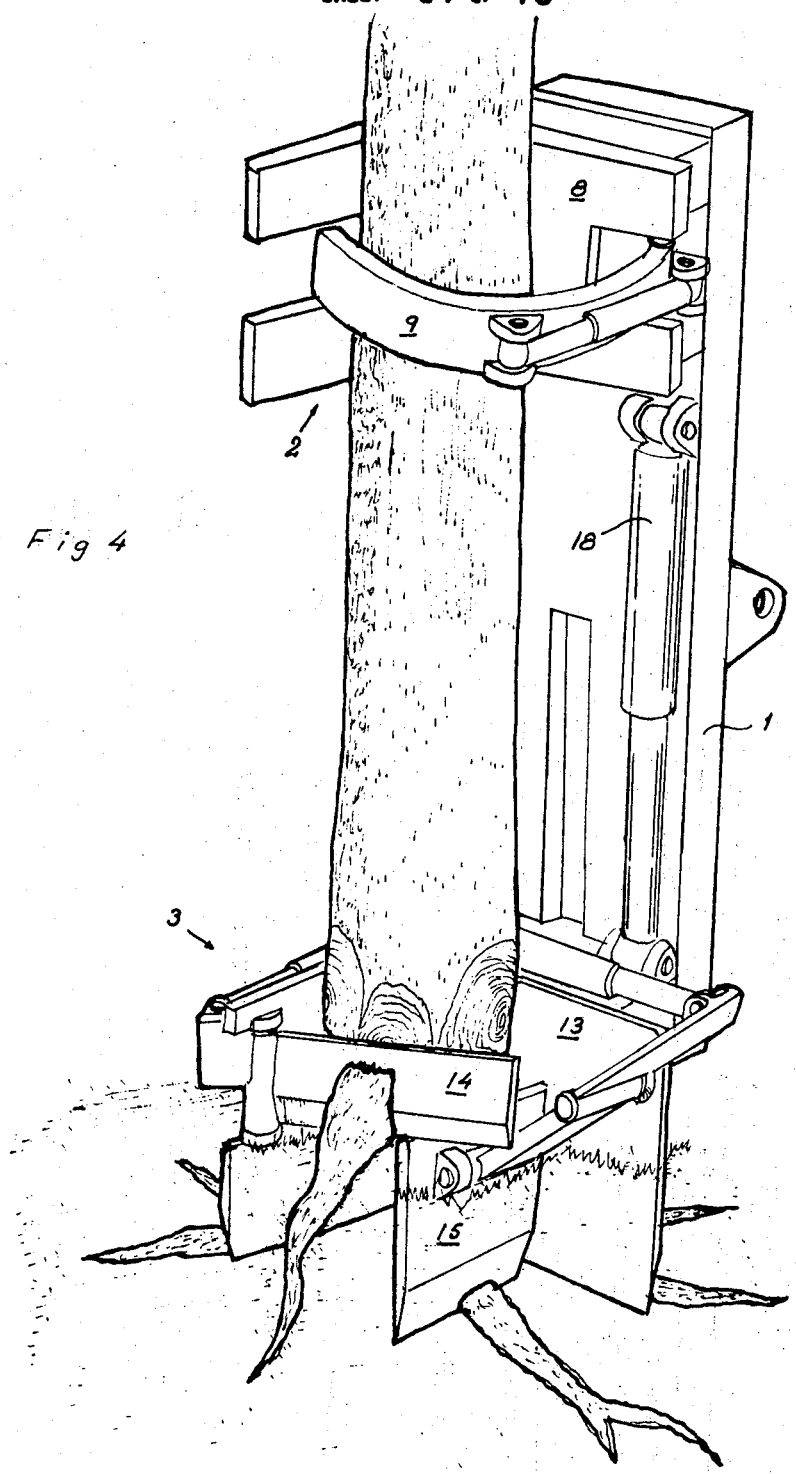
Figure 5:
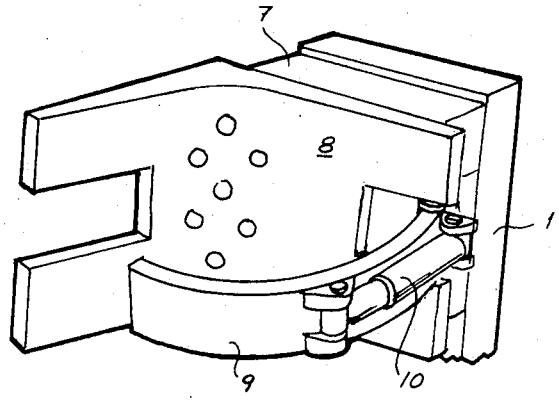
Figure 6:
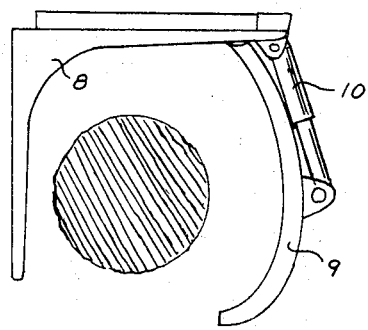
Figure 9:
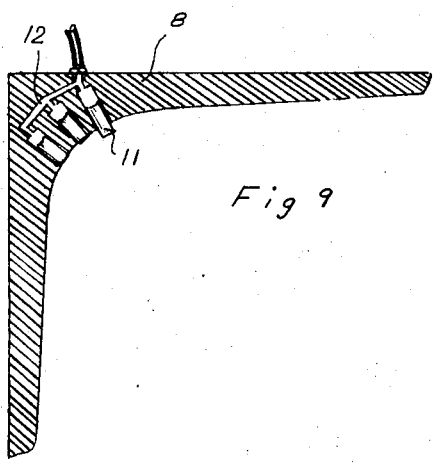
Figure 10:
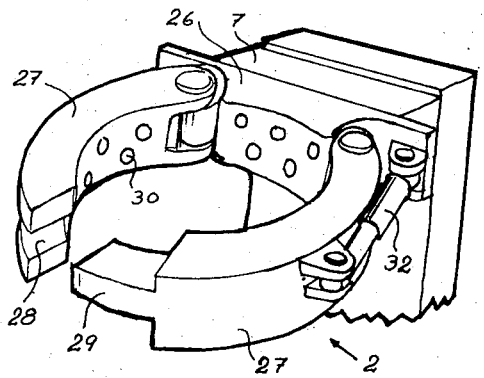
Figure 14:
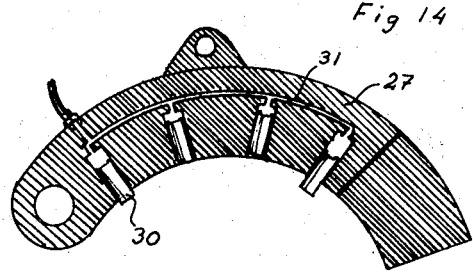
Figure 11:
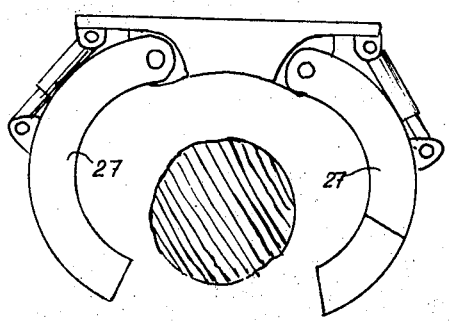
Figure 12:
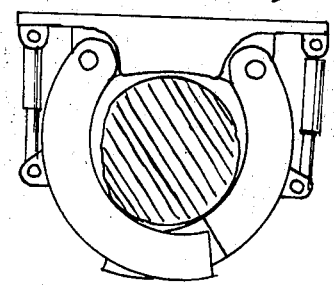
Figure 19:
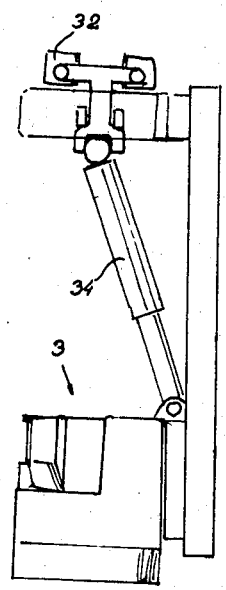
Figure 42:
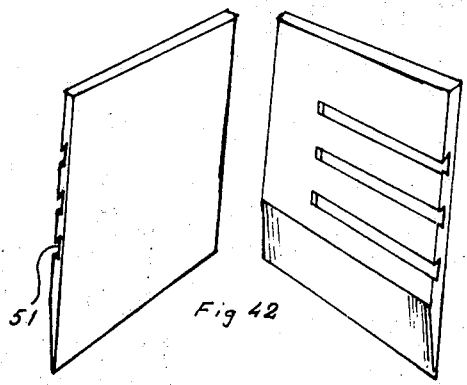
Figure 41:
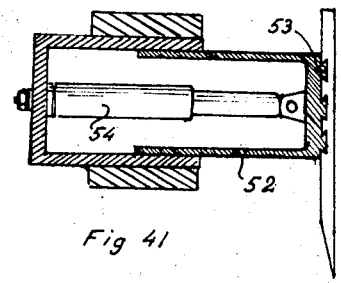
Figure 47:
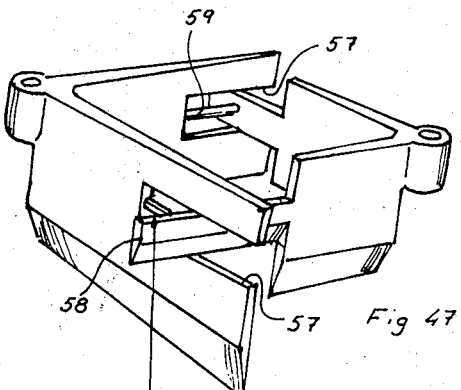
Figure 48:
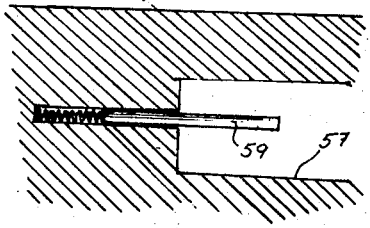
Figure 49:
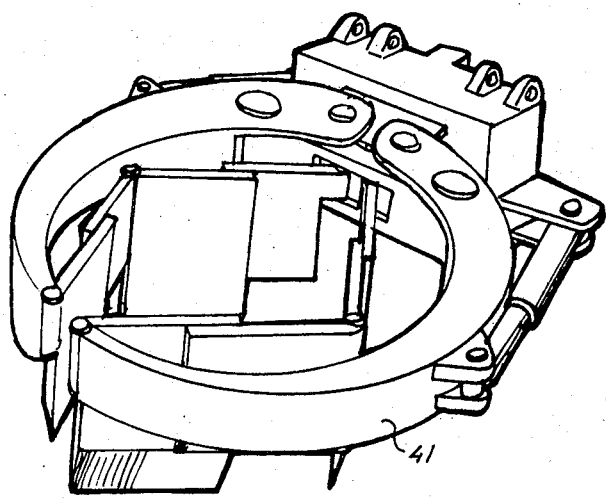
Figure 50:
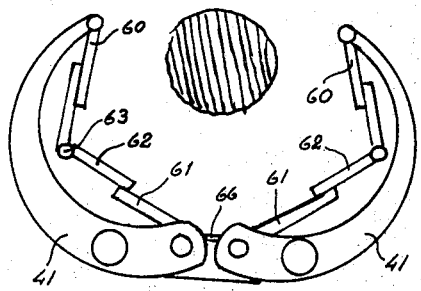
Figure 51:
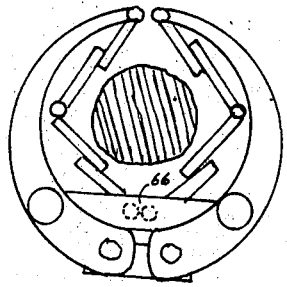
Figure 53:
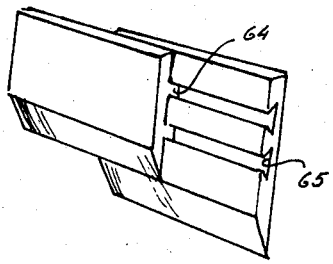
Figure 52:
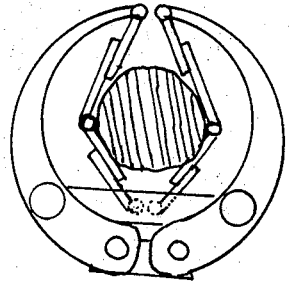

In the following the invention will be further described with reference to the accompanying drawings in which FIG. 1 shows a suitable embodiment of an apparatus according to the invention, FIGS. 2 – 4 show different stages in the felling of a tree using an apparatus in accordance with FIG. 1, FIGS. 5 – 8 show a gripping member used in the apparatus according to FIG. 1, FIG. 9 shows a cross-section through the support of this gripping member, FIGS. 10 – 13 show another embodiment of a gripping member, FIG. 14 shows a cross-section through one gripping arm of this gripping member, FIGS. 15 – 18 show a gripping member according to FIG. 10 provided with special clamping means, FIG. 19 shows a part of an apparatus provided with such clamping means and pressure actuating means for one of these clamping means, FIGS. 20 – 23 show machining member according to FIG. 1, FIGS. 24 – 27 show an alternative embodiment at the machining member according to FIG. 1, FIGS. 28 – 32 show two other embodiments of the machining member, FIG. 33 shows a cutter having a chip breaker, FIG. 34 shows the cutting tool of a machining member provided with such chip breakers, FIGS. 35 and 36 show an embodiment of a cutting tool, FIGS. 37 – 40 show yet another embodiment of a machining member, FIGS. 41 and 42 show various details in cutters of the machining member according to FIG. 37, FIGS. 43 – 46 show still another embodiment of a machining member, FIGS. 47 and 48 show various details of cutters of the machining member according to FIG. 43, FIGS. 49 – 52 show another embodiment of a machining member, and FIG. 53 shows the connection between two cutters used in the embodiment according to FIG. 49.

The apparatus shown in FIGS. 1 – 4 comprises a frame or stand 1, a gripping member 2 and a machining member 3. The apparatus is arranged to be operated in all directions from a vehicle by way of operating arms or crane arms operated hydraulically, for example, or in some other manner. FIG. 1 shows merely schematically a simple solution in principle of the suspension of the apparatus on a cross-country vehicle 4, by means of two operating arms 5 journalled on the stand 1. Movement of the apparatus in vertical plane or in some other inclined plane may be achieved, for example, by means of one or more hydraulic cylinders (not shown) attached to the operating arms and the stand 1.

The gripping member 2 is rigidly attached to the stand 1 by way of a support plate 7 and comprises a gripping support 8 fixed to this plate 7, and a gripping arm 9 movable in relation to the support 8. The gripping arm 9, which is bent towards the support 8, is hinged about a vertical axis and is operated by means of a hydraulic cylinder 10 attached to the stand 1 and the gripping 9. The support 8, which is angle-shaped and has a bowl-shaped or bevelled inner surface, is provided on its free part with a recess 6 to receive the free end of the hinged gripping arm 9. The surfaces of the gripping arm and the support which face each other, or the operative parts of these surfaces are given such geometric shape that the greatest possible area of contact against the tree trunk is obtained for varying tree dimensions. The support 8 is also provided with a number of small hydraulic pistons 11 arranged to be operated by a common hydraulic system through channels 12 (FIG. 9) arranged in the support.

The machining member 3 is movably arranged in relation to the gripping member 2 and the stand 1 and comprises a cutting tool including a cutter 13 having angle-shaped or bowl-shaped cross-section and two movable cutters 14, 15. The side of the stand facing away from the vehicle 4 has an elongate wedge-shaped slot 16 to receive a guide or guiding rail 17 which is arranged on or produced on a support plate 19 attached to the cutter 13. The machining member 3 is arranged to be operated by two hydraulic cylinders 18 attached to the stand so that while being operated or moved the machining member will at the same time be guided along the stand by means of the guide 17 cooperating with the slot 16.

Figure 23:
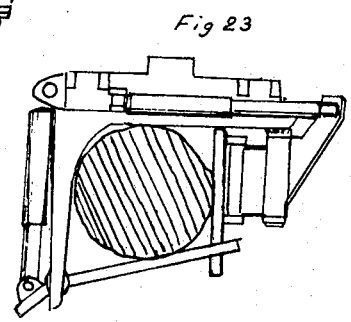

One of the movable cutters 14, is hinged at the free end of the cutter 13 about a vertical axis and is connected by way of a connection piece 20 to a hydraulic cylinder 21 attached to the plate 19, by means of which the cutter 14 can be swung from an outer position (FIG. 21), the machining member being open, to an inner, operative position (FIG. 23). The other movable cutter 15, is arranged to be moved in relation to the opposite part of the cutter 13 projecting from the stand, by means of a hydraulic cylinder 22 attached to the plate 19, via a link system. In the embodiment shown in FIGS. 1 – 4 the cutter 15 is activated by the hydraulic cylinder 22 via a link arm 23 which is hinged about an axle pin 24 projecting from and attached to the angle-shaped cutter 13. The link arm 23 is hereby jointed to both the piston rod 25 of the hydraulic cylinder 22 and the cutter 15. In order to enable the cutter 15 to be moved parallel and also to prevent it from becoming inclined with respect to the opposite part of the cutter 13 during an operation, it may be suitable to use a suitable parallelogram mechanism as link system between the hydraulic cylinder 22 and the cutter 15.

Figure 20:
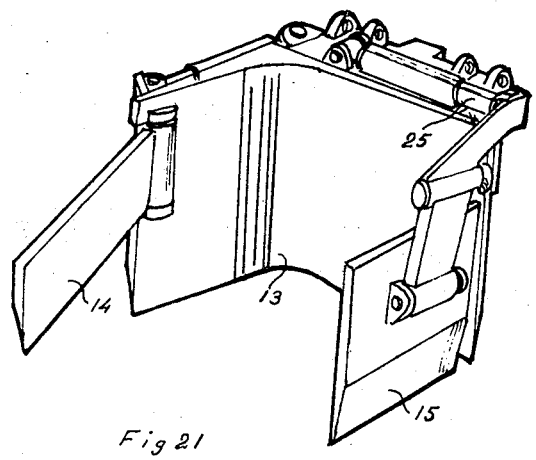
Figure 21:
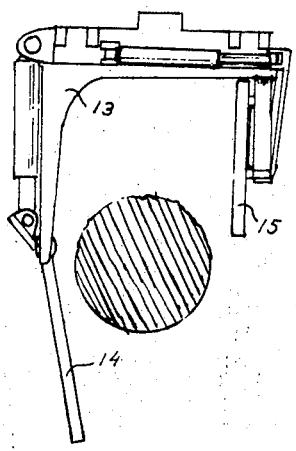

The angle-shaped cutter 13 has a bevelled inner surface, as can be seen from FIG. 20. The other cutters 14, 15 may also be curved or provided with bowl-shaped inner surfaces in order to achieve a better fit to the periphery of the tree trunk. The cutter 14, according to a different embodiment, may be replaced by a support arm hinged and operated in a corresponding manner, which has a curved or arc-shaped cutter pivotably journalled on the support arm or movable in relation to this by means of a hydraulic cylinder.

Figure 7:
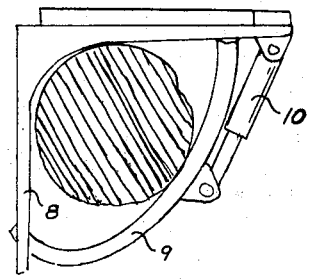
Figure 8:
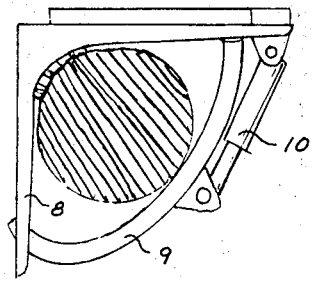
Figure 22:
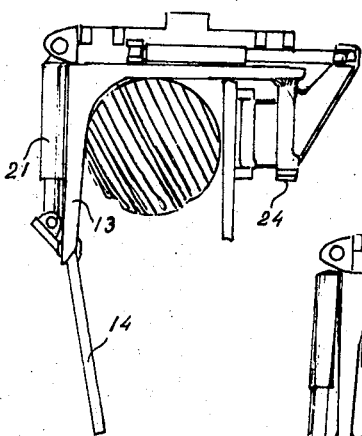

The unit shown in FIGS. 1 – 4 is used as follows for felling trees. In the starting position the gripping member 2 and the machining member 3 are open to receive a tree trunk, the gripping arm 9 being drawn back to the position shown in FIG. 6 and the cutters 14 and 15 being placed in the positions shown in FIG. 21. The machining member 3 is drawn up to its uppermost position by means of the hydraulic cylinders 18. The apparatus is operated and aimed so that the support 8 and the angle-shaped cutter 13 are brought into abutment with the tree trunk, as can be seen in FIG. 7 and 22 respectively, after which the gripping arm 9 and the cutters 14, 15 are brought into abutment with the tree trunk as shown in FIG. 2, by means of the hydraulic cylinders 10, 21 and 22, respectively. The hydraulic system which actuates the hydraulic pistons arranged in the support 8 is then brought into operation, pressing the piston a little way into the tree trunk and, together with the gripping arm 9, effecting a firm grip on the trunk and preventing the gripping member 2 and the stand 1 from being displaced upwardly in relation to the trunk when the machining member 3 is operating. After these initial stages, the machining member 3 is moved down along the stand under the influence of the hydraulic cylinders 18. The angle-shaped cutter 13 and the cutter 15 are thus pressed down so that the roots of the tree are gradually cut off, as can be seen in FIG. 3. The tree may be lifted even before the cutters 13, 15 have been pressed through the roots under them. Under all circumstances the tree trunk is lifted when some or all of these roots have been cut off. Any root forks below the cutter 14 are removed during the continued lifting of the tree trunk, the roots thus being left in the ground in substantially their original position. The tree trunk removed from the root system is then lifted still further if necessary, with the help of the lifting arm carrying the apparatus which can manoeuvre and direct the apparatus so that the tree falls in the direction intended when the gripping member 2 and the machining member 3 are opened.

Figure 13:
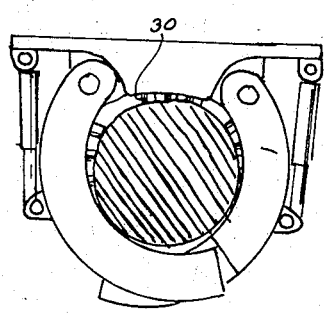

FIG. 10 shows an alternative embodiment of a gripping member consisting of a support 26 attached to a plate 7 and two curved or bent gripping arms 27, each pivotable about a vertical axis at the support 26. One of the gripping arms 27 is provided with a recess 28 to receive a support plate 29 on the other gripping arm. Each gripping arm 27 is operated by a hydraulic cylinder 33 attached to the support 26 between the positions shown in FIGS. 11 and 13. Both the gripping arms 27 and the support 26 are provided with a number of small hydraulic pistons 30 which are actuated by a common hydraulic system through channels 31 arranged in these parts, so that when the gripping arms enclose a tree trunk these pistons will be pressed out to efficient abutment with the tree trunk, as seen in FIG. 13.

Figure 15:
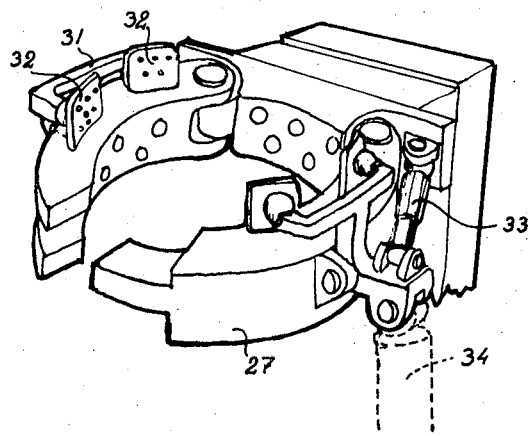
Figure 16:
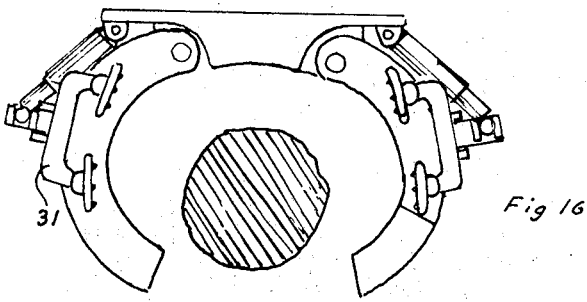
Figure 17:
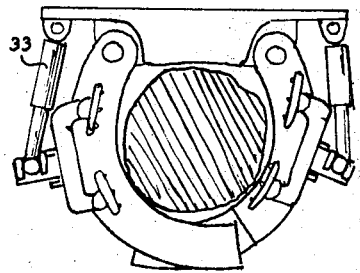
Figure 18:
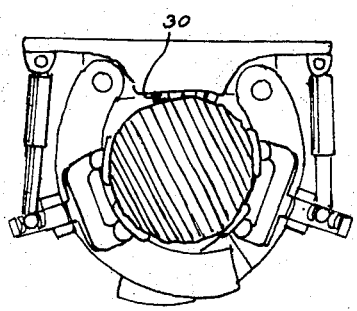

As shown in FIG. 15 the gripping member described above may be provided with additional clamping means in the form of a clamping arm 31 pivotably journalled on each gripping arm 27 and arranged with two clamping plates 32 spaced from each other. In this embodiment the hydraulic cylinders 33 are journalled on the clamping arms 32 acting as levers, each clamping arm taking up one end of a hydraulic cylinder 34, the other end of which is journalled in the machining member 3. While the apparatus is machining a tree the pressure of the clamping plates 32 against the tree trunk will vary according to the pressure applied on the machining member 3 to force the cutters through the roots.

Figure 24:
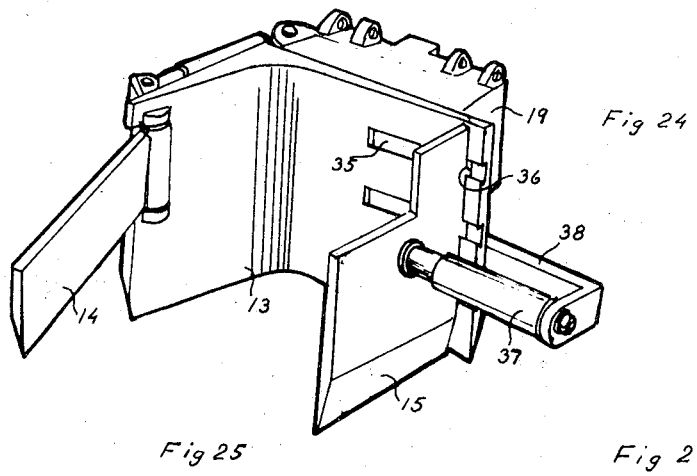
Figures 25, 26:
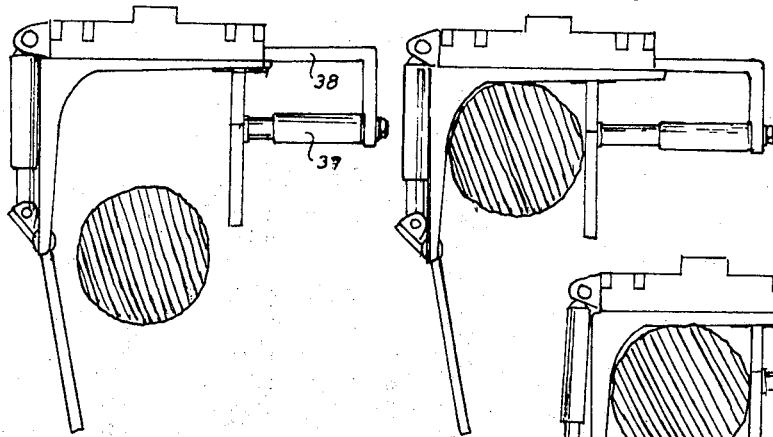
Figure 27:
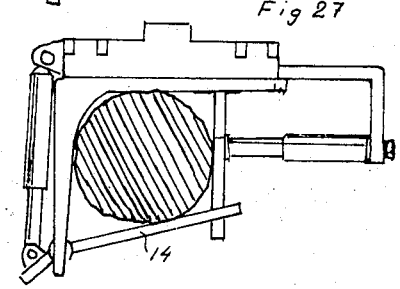

FIG. 24 shows an alternative embodiment of the machining member 3 according to FIG. 1. The angle or bowl-shaped cutter 13 is in this case provided with three parallel, wedge-shaped slots 35 to receive guides 36 produced or arranged on the vertical side edge of the cutter 15. The cutter 15 is moved along the slotted part of the cutter 13 by means of a hydraulic cylinder 37 which is journalled at one end in the cutter 15 and at its other is attached to an angle arm 38 attached to the plate 19.

FIG. 28 shows yet another embodiment of a machining member 3 which comprises a connection piece 39 attached to the plate 19 and two arms 41 pivotably journalled about vertical shaft pins 40 and attached to the connecting piece 39. The arms 41 are operated by hydraulic cylinders 48 and carry a number of cutters or cutting steels 42 overlapping each other and having inclined or bevelled cutting edges. Each cutting steel 42 is carried by a link arm 43 hinged about a pin 44 in the arm 41. Furthermore, each cutting steel 42 is pivotably journalled about a vertical axis 45 at the inner end of the link arm 43. The ends of the link arms 43 facing away from the cutting steels 42 are at each arm 41 joined to a connecting rod 46 which, in order to provide a synchronised movement of the cutting steels about their respective journalling pins 44, is arranged to be actuated by a hydraulic cylinder 47 (only one shown in FIG. 28) attached to each arm 41. The synchronised movement of the cutting steels 42 about their respective journalling pins 44 can also be achieved by means of a chain or the like arranged in each arm and cooperating with the journalling pins, these being provided with gear drives or gear wheels for example. If the cutting steels are operated in this manner, the ends of the link arms are journalled at the journalling pins 44 as shown in FIG. 28. The length of the cutting steels 42 is such that they overlap even when the arms are extended as shown in FIG. 29. The cutting steels 42, the design and grinding of which can be seen in FIGS. 35 and 36, suitably become narrower in the longitudinal direction and are slightly curved in order to achieve the greatest possible contact surface with the tree trunk. The cutting steels 42 may also be provided with chip breakers 49, for example as shown in FIGS. 33 and 34. A machining member provided with such cutters or cutting steels 42 is operated in the manner illustrated in FIGS. 29 – 31.

Figure 37:
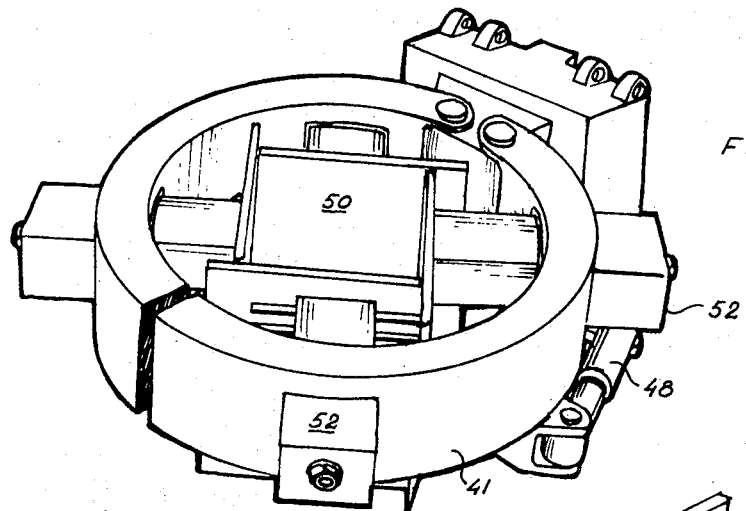
Figure 38:
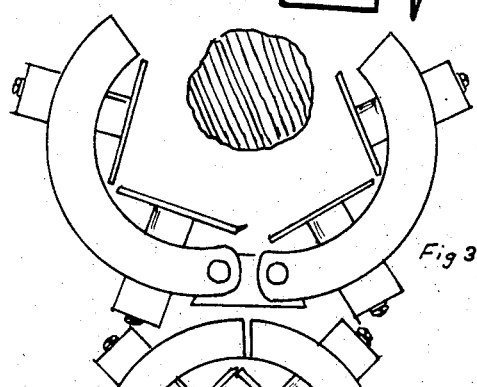
Figure 39:
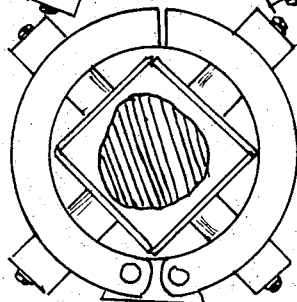
Figure 40:
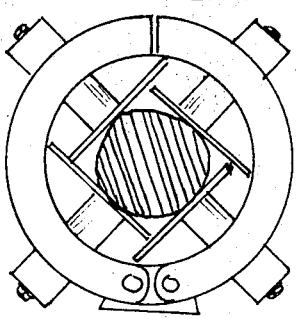

The machining member shown in FIG. 37 is provided with two cutters 50 journalled at each arm 41, the cutters being provided with wedge slots 51 (FIG. 42) to cooperate with corresponding guides 53 on a telescope tube 52. The telescope tubes are fastened at one end in the arms, displacement of the cutters being effected by a hydraulic cylinder 54 arranged in each telescope tube, as can be seen more clearly in FIG. 41. FIGS. 38 – 40 illustrate this gripping member receiving a tree trunk and how the cutters are brought to enclose and abut the tree trunk.

Figure 43:
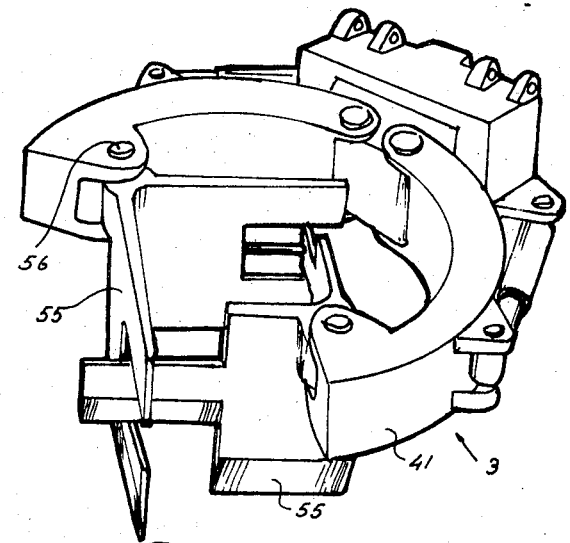
Figure 44:
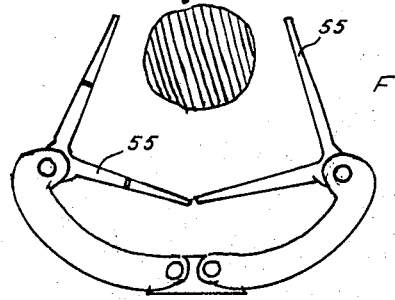
Figure 45:
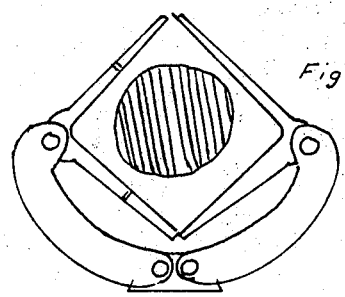
Figure 46:
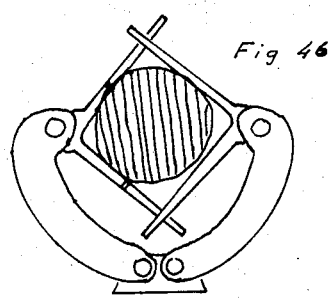

According to the embodiment of the gripping member shown in FIG. 43, the free ends of the arms 41 are arranged to carry an angle-shaped cutter 55 on each arm, the cutter being hinged about a vertical axis 56. One of the cutters is here provided with recesses 57 to receive edged projections 58 on the other cutter, which are suitably arranged to abut spring-tensioned pegs 59 arranged in the cutter provided with recesses, as shown in FIG. 48.

The machining member shown in FIG. 49 comprises an outer cutter 60 pivotably journalled at the free end of each arm 41 and two cutter 61 pivotably journalled to a connection piece 66. Between the cutter 61 and the outer cutter 60 on each side there is an angle-shaped cutter 62, the two parts of which are hinged about a common shaft pin 63. The side surfaces of the cutters 61, 62 and 63 abutting each other are provided with guides 64 and corresponding grooves 65, as shown more clearly in FIG. 53. When the arms 41 are moved between the positions shown in FIGS. 50 – 52 the cutters will be displaced in their longitudinal directions and controlled by means of the guides shown, so that they enclose the tree trunk.

The invention is not limited to the embodiments of the apparatus described above and shown in the drawings, but can be varied in many ways within the scope of the following claims. For instance, the stand or frame can be designed to comprise two or more pillars or rods, one or more of which controls the gripping member or the machining member. Furthermore, the gripping member according to FIG. 1 may be provided with several gripping arms 9 which may then suitably be provided with varying radius of curvature. The surfaces of the gripping member elements which are in contact with the tree trunk, such as support or gripping arms, may be provided with pressure pistons 11 in accordance with FIG. 1. These pressure pistons may even be replaced partially or entirely by pins and/or longitudinal projections which grip into the tree trunk.

The chip breakers 49 shown in FIG. 33 may of course be designed and arranged differently on the cutters.

What we claim is:

1. An apparatus for felling trees by separating from the trunk of a tree those roots which extend peripherally outward therefrom so that those said roots remain substantially in their original position under the ground, said apparatus comprising a frame, means for flexibly mounting said frame to a vehicle for movement of said frame with respect to said vehicle, a first member consisting essentially of a gripping member supported by said frame and arranged to grip and hold the trunk of a tree during application of an upward lifting force on said gripping member, a second member consisting essentially of a machining member supported by said frame in spaced downward relationship from said gripping member, a longitudinal guide means immovably fixed to said frame and through which at least one of said first and second members is movably journalled to said frame, and force-transmitting means laterally spaced from said longitudinal guide means and operable to effect relative movement of said gripping member and said machining member longitudinally away from each other along a line of movement guided by said longitudinal guide means, said machining member being characterized by having downwardly projecting exposed cutting edges as the lowermost structural part thereof, said cutting edges being adapted to be positioned to substantially circumscribe the periphery of the trunk of the tree held by said gripping member and further being adapted to press into and sever those roots which extend peripherally outward from said trunk as said machining member is relatively moved longitudinally away from said gripping member.

2. Apparatus according to claim 1, characterized in that said gripping member is fixed to said frame and that said machining member is movable in relation to said frame.

3. Apparatus according to claim 1, characterized in that said gripping member consists essentially of a support and at least one gripping arm which is pivotable against said support.

4. Apparatus according to claim 3, characterized in that said support is immovably fixed to said first member.

5. Apparatus according to claim 1, characterized in that pressure operated pistons are arranged in said gripping member and are adapted to be brought into contact with a tree trunk held by said gripping member.

6. Apparatus according to claim 1, characterized in that at least two said cutting edges are moveable relative to each other.

7. Apparatus according to claim 1, characterized in that said force-transmitting means comprises a hydraulic cylinder.

8. Apparatus according to claim 5, characterized in that said pressure pistons are brought into contact with a tree trunk by hydraulic means.

9. Apparatus according to claim 3, characterized in that said support has a recess adapted to receive said one gripping arm as it is pivoted against said support.

10. Apparatus according to claim 3, characterized in that said gripping member comprises two gripping arms, each of which is pivotably journalled at said support, said gripping member being provided with pressure pistons adapted to be brought into contact with a tree trunk held by said gripping member.

11. Apparatus according to claim 1, characterized in that said gripping member is provided with pressure plates arranged to be pressed into abuttment with the tree trunk by means of clamping arms.

12. Apparatus according to claim 6, characterized in that a link mechanism in the shape of a parallelogram supports at least one of said cutting edges for relative movement toward the other.

13. Apparatus according to claim 6, characterized in that a slide guide arrangement is provided for the movement of at least one of said cutting edges.

14. Apparatus according to claim 1 characterized in that the machining member comprises two arms, each said arm supporting a number of cutting edges pivotable on a vertical axis.

15. Apparatus according to claim 1, characterized in that said machining member comprises two arms movable with respect to each other, each said arm carrying at least one telescopic tube, and each telescopic tube carrying a said cutting edge of said machining member.

16. Apparatus according to claim 1, characterized in that said machining member comprises two arms movable with respect to each other, each carrying a cutting edge having an angle-shape.

17. Apparatus according to claim 1, characterized in that said machining member carries chip breakers.

18. Apparatus according to claim 1, characterized in that stopping means limits the downward movement of said cutting edges before lifting of the tree is initiated.

* * * * *

UNITED STATES PATENT OFFICE
CERTIFICATE OF CORRECTION

Patent No. 3,822,730      Dated July 9, 1974

Inventor(s) Gustaf Matteus Hultdin and Ove Anders Hultdin

It is certified that error appears in the above-identified patent and that said Letters Patent are hereby corrected as shown below:

Column 2, line 35, "the suspension" should read -- the flexible suspension --.

Column 2, line 43, "stand 1", should read -- stand or frame 1 --.

Column 2, line 64, "the stand 1", should read -- the frame or stand 1 --.

Column 2, line 66, "cutters 14, 15. The", should read -- cutters 14, 15. To be noted is that the cutters have downwardly projecting cutting edges exposed as the lowermost structural part of the machining member 3. The --; "the stand" should read -- the frame or stand --.

Column 3, line 1, "slot 16 to", should read -- slot 16 (that is, a longitudinal guide means) to --; "a guide", should read -- a rail guide --.

Column 3, line 7, "the guide 17", should read -- the rail guide 17 --.

Column 3, line 8, "slot 16.", should read -- slot 16 (that is the longitudinal guide means). The hydraulic cylinders 18 are suitably characterized as force-transmitting means laterally spaced from the longitudinal guide means or slot 16.--

Column 3, line 67, "the roots", should read -- the peripherally outward roots --.

Column 4, line 4, "Any root", should read -- Those root --; "forks below", should read -- forks peripherally outward and below --

UNITED STATES PATENT OFFICE
CERTIFICATE OF CORRECTION

Patent No. 3,822,730  Dated July 9, 1974

Inventor(s) Gustaf Matteus Hultdin and Ove Anders Hultdin

It is certified that error appears in the above-identified patent and that said Letters Patent are hereby corrected as shown below:

Column 4, line 24, "are actuated", should read -- are pressure operated or actuated --

Column 5, line 23 (Claim 1), "movably journalled", should be -- movable with respect --.

Signed and sealed this 5th day of November 1974.

(SEAL)
Attest:

McCOY M. GIBSON JR.
Attesting Officer

C. MARSHALL DANN
Commissioner of Patents